Feb. 9, 1932.　　　　O. E. CLARK　　　　1,844,272

CLUTCH

Original Filed May 14, 1928　　3 Sheets-Sheet 1

Inventor

OMAR E. CLARK

By

Attorney

Feb. 9, 1932. O. E. CLARK 1,844,272
CLUTCH
Original Filed May 14, 1928 3 Sheets-Sheet 2

Inventor
OMAR E. CLARK
By
Attorney

Feb. 9, 1932.  O. E. CLARK  1,844,272
CLUTCH
Original Filed May 14, 1928  3 Sheets-Sheet 3

Fig. 3.

Inventor
OMAR E. CLARK
By
Attorney

Patented Feb. 9, 1932

1,844,272

UNITED STATES PATENT OFFICE

OMAR E. CLARK, OF OMAHA, NEBRASKA, ASSIGNOR TO GARDNER-DENVER COMPANY, OF DENVER, COLORADO, A CORPORATION OF DELAWARE

CLUTCH

Original application filed May 14, 1928, Serial No. 277,625. Divided and this application filed July 1, 1929. Serial No. 375,298.

The present invention relates to clutches, and in its specific aspect, to that type for automatically connecting a rotatable element to a driving mechanism.

The present invention is a required division of application, Serial No. 277,625, filed May 14, 1928.

The object is to provide simple, effective and novel mechanism for clutching a drum or drums to and unclutching the same from the driving mechanism.

In the accompanying drawings:

Figure 3 is a cross sectional view on the line 3—3 of Figure 1.

Figure 1:
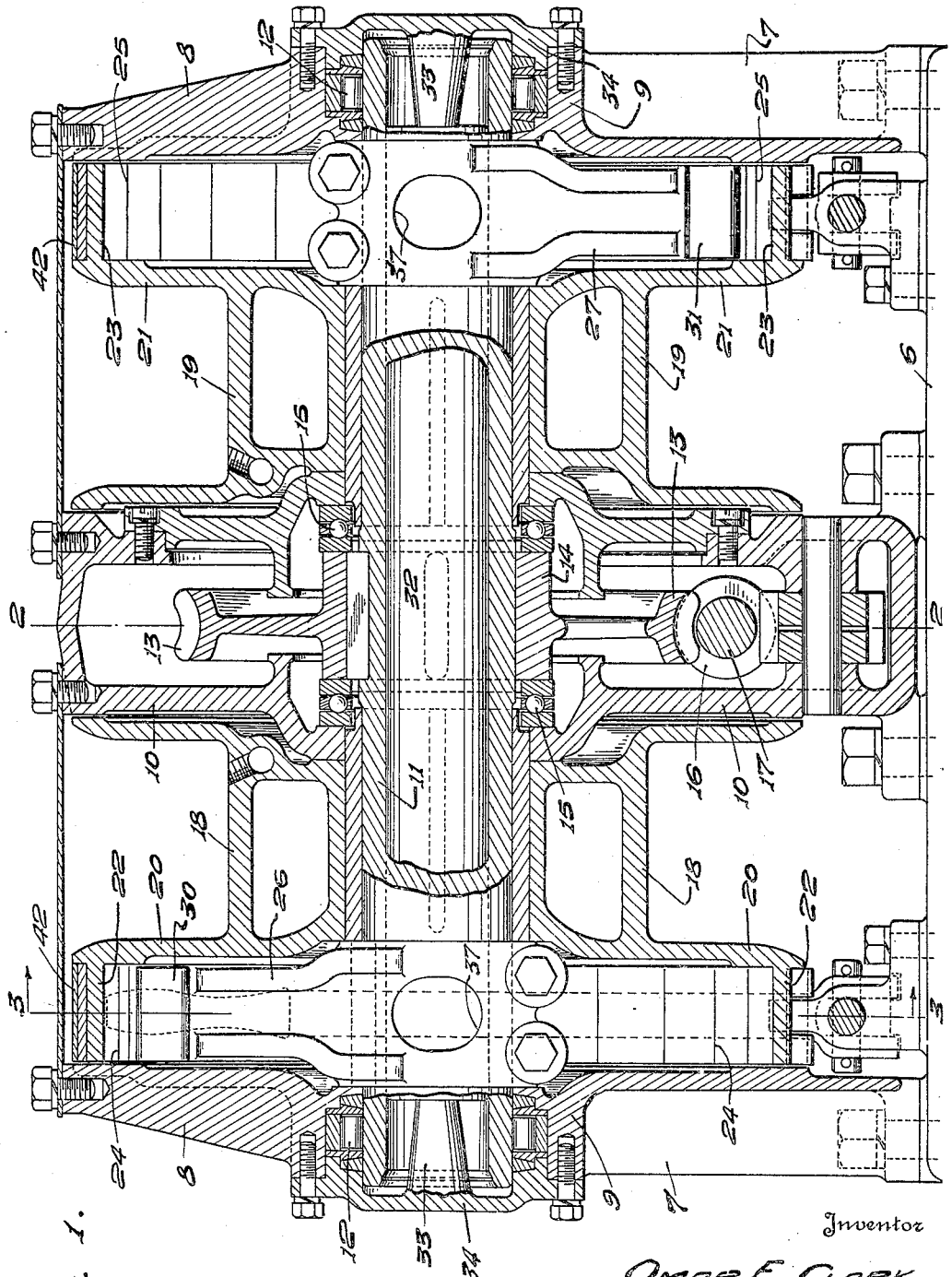
Figure 1 is a longitudinal sectional view through the preferred embodiment of the invention.
Figure 2:
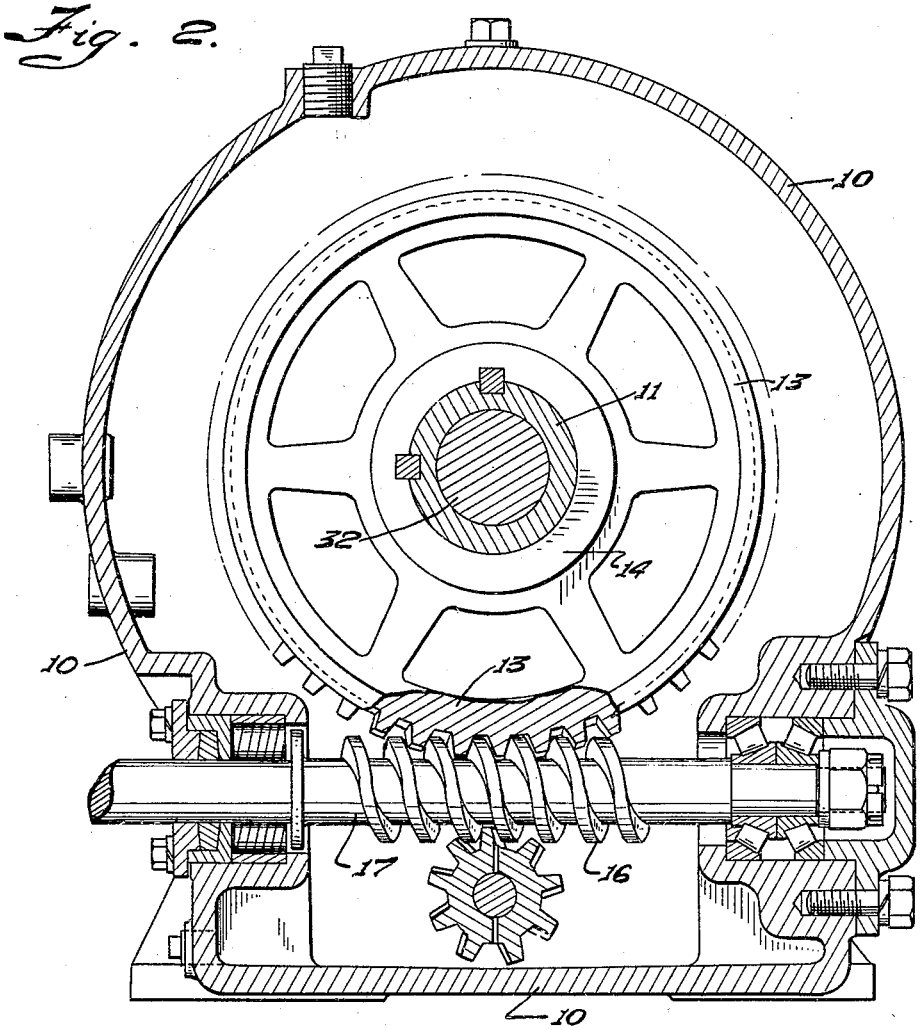
Figure 2 is a cross sectional view on the line 2—2 of Figure 1.
Figure 4:
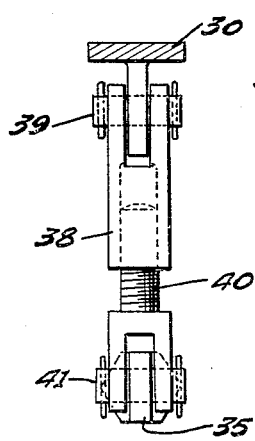
Figure 4 is a detail side elevation of the coupling link between one of the clutch pawls and the controlling arm.

In the embodiment disclosed a support is employed, comprising a base 6 supporting the drum mechanism. Mounted on this base are standards 7 carrying closure plates or heads 8, in which are formed journal boxes 9. The base 6 furthermore has bolted to its central portion a casing 10 located between the standards 7 and head plates 8.

A tubular shaft 11 has its ends mounted in roller bearings 12 in the boxes 9 and said shaft passes through the central portion of the casing 10.

Keyed to this shaft and located in the casing 10 is a worm gear 13, and interposed between the hub 14 of said worm gear and the opposite side walls of the casing 10 are thrust bearings 15. The worm gear is in mesh with a worm 16 carried by a drive shaft member 17 operated by a motor or other suitable means.

Loosely journaled on the shaft 11 between the head walls 8 and the casing 10 are two winding drums 18 and 19. The outer heads 20 and 21 of the drums are provided with outstanding flanges 22 and 23 whose outer edges are adjacent to the inner faces of the head walls 8, thereby forming with said walls enclosed chambers. The said flanges 22 and 23 are provided on their inner sides with clutch teeth 24 and 25, the teeth 25 being reversely arranged to the teeth 24 in a manner well understood.

Fixed to the tubular shaft 11 within the chambers above mentioned are carrier or driver arms 26 and 27 that are preferably diametrically opposite. These arms terminate in knuckle heads 28 and 29 and on said heads are journaled oppositely acting clutch pawls 30 and 31 adapted to respectively engage the teeth 24 and 25 of the two drums. Located within the shaft 11 is a rock shaft 32 that allows a limited rotary movement with respect to the shaft 11. This rock shaft 32 is held against longitudinal movement by bearing studs 33 (see Figure 1), abutting the ends of said shaft 32 and carried by caps 34 bolted to the head walls 8. The rock shaft 32 has secured to it laterally projecting controlling arms 35 that pass through slots 36 formed in the shaft 11 and through slots 37 formed in the hubs of the driver arms 26 and 27. Connecting the outer ends of the controlling arms 35 and the pawls 30 and 31 are extensible links, each consisting of a sleeve 38 pivoted to the pawl, as shown at 39 and a shank 40 threaded into the sleeve 38 and pivotally connected, as shown at 41 to the arm 35. It will be understood that there are two of these arms 35, one at each end of the rock shaft.

For the purpose of holding the drums, the peripheral faces of the flanges 22 and 23 constitute braking surfaces that are surrounded by brake bands, 42.

With the structure as thus described, if the drive shaft 17 is rotated in one direction, it will drive the tubular shaft 11 in one direction through the worm 16 and worm gear 13.

Referring to Figure 3 and assuming that the shaft 11 is started to the left or in a counter-clockwise direction, the arm 26 will move to the left, but initially the arm 35 will remain stationary. As a consequence the pawl 30 will be tilted outwardly and caused to engage behind one of the teeth 24. The drum 18 will therefore be rotated. The other pawl 31 will, however, be operated in the opposite direction, that is to say, the arm 27 will move to the right and as the other arm 35 initially remains stationary, the link 38—40 will pull the pawl 31 inwardly away from the teeth 25. Consequently the drum 19 is released and is free to rotate. When the direction of rotation of the driving shaft 17 is reversed the pawl 30 will be withdrawn from the teeth 24 while the pawl 31 will be moved outwardly, and engage the teeth 25 so that the drum 19 will be clutched and driven while the drum 18 will be released.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a hoist, the combination with a rotatable tubular drive shaft, of a drum rotatable thereabout and having clutch teeth, an arm carried by the shaft, a pawl movably mounted on the arm and movable into and out of engagement with the teeth, a rock shaft within the tubular shaft, an arm carried by the rock shaft and having a limited play with respect to the tubular shaft, and means connecting the second arm and pawl to effect its movement on the first arm and thereby its movement into and out of engagement with the teeth of the drum.

2. In a hoist, the combination with a rotatable tubular shaft, of a drum rotatable thereabout and having clutch teeth, an arm fixed to the shaft, a clutch pawl pivoted on the arm and cooperating with the teeth to rotate the drum, a rock shaft journaled in the tubular shaft, a second arm carried by the rock shaft, and a link connection between the second arm and pawl.

3. In a hoist, the combination with a rotatable tubular shaft, of a drum rotatable thereabout and having clutch teeth, an arm fixed to the shaft, a clutch pawl pivoted on the arm and cooperating with the teeth to rotate the drum, a rock shaft journaled in the tubular shaft, a second arm carried by the rock shaft, and an adjustable connection between the second arm and pawl.

4. In a hoist, the combination with a rotatable tubular drive shaft, of a drum rotatably mounted thereabout and having clutch teeth, an arm fixed to the shaft, a clutch pawl pivoted on the arm and engageable with the teeth to rotate the drum, a shaft within the first said shaft, an arm fixed thereto, and said second shaft having a limited movement with respect to the first said shaft to cause an initial clutching movement of the pawl and thereafter a rotatable driving movement of the drum.

In testimony whereof, I affix my signature.

OMAR E. CLARK.